(12) United States Patent
Shotey et al.

(10) Patent No.: US 8,258,401 B1
(45) Date of Patent: Sep. 4, 2012

(54) ZERO PROFILE WHILE IN-USE ELECTRICAL OUTLET COVER

(75) Inventors: Marcus J. Shotey, Scottsdale, AZ (US);
Richard L. Cleghorn, Tempe, AZ (US);
Kenneth C. Booth, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 113 days.

(21) Appl. No.: 12/902,027

(22) Filed: Oct. 11, 2010

Related U.S. Application Data

(63) Continuation of application No. 12/199,752, filed on Aug. 27, 2008, now Pat. No. 7,820,912.

(60) Provisional application No. 60/968,251, filed on Aug. 27, 2007.

(51) Int. Cl.
*H02G 3/14* (2006.01)
(52) U.S. Cl. .............................. 174/67; 174/66; 220/242
(58) Field of Classification Search .................... 174/66, 174/67; 220/241, 242
See application file for complete search history.

(56) References Cited

U.S. PATENT DOCUMENTS

| 4,484,021 A | * | 11/1984 | Schaefer et al. ................ 174/53 |
| 4,988,832 A | | 1/1991 | Shotey |
| 5,171,939 A | * | 12/1992 | Shotey ............................ 174/67 |
| 5,389,740 A | | 2/1995 | Austin |
| 5,574,256 A | | 11/1996 | Cottone |
| 5,779,083 A | * | 7/1998 | Bordwell ....................... 220/242 |
| 6,956,169 B1 | | 10/2005 | Shotey et al. |
| 2003/0089710 A1 | | 5/2003 | Gates, II |

* cited by examiner

*Primary Examiner* — Dhirubhai R Patel
(74) *Attorney, Agent, or Firm* — Booth Udall, PLC

(57) ABSTRACT

An electrical outlet cover assembly with an electrical outlet mounting box having a front edge that does not extend beyond a front surface of a wall. An extendable base is coupled with the electrical outlet mounting box and is slideable between collapsed and extended positions. When collapsed, a leading edge of the extendable base does not extend beyond the front surface of the wall. One or more guides resist decoupling of the extendable base and the electrical outlet mounting box. A lid is pivotably coupled with the extendable base, and one of the lid and the extendable base has a cord port along their respective edges. The lid has a front surface and is positionable between open and closed positions. The lid's front surface is substantially flush with the front surface of the wall when the base is collapsed and the lid is closed with respect to the extendable cover.

16 Claims, 6 Drawing Sheets

ZERO PROFILE WHILE IN-USE ELECTRICAL OUTLET COVER

CROSS REFERENCE TO RELATED APPLICATIONS

This document is a continuation application of the earlier U.S. patent application to Shotey et al. entitled "ZERO PROFILE WHILE IN-USE ELECTRICAL OUTLET COVER," application Ser. No. 12/199,752, filed Aug. 27, 2008, now U.S. Pat. No. 7,820,912, which claimed the benefit of U.S. Provisional Patent Application 60/968,251 to Shotey et al. entitled "Low Profile While In-Use Electrical Device Cover," filed Aug. 27, 2007, the disclosures of which are hereby incorporated herein by reference.

BACKGROUND

1. Technical Field

Aspects of this document relate generally to covers for electrical outlets.

2. Background Art

Electrical outlets may be exposed to rain, snow, debris, and other contaminants when mounted in outdoor locations, such as exterior walls. While many different cover designs have sought to shield electrical outlets from weather-related contaminants when electrical connectors are coupled with the outlets, such covers may protrude from exterior walls where they may be damaged, may appear unsightly, or may interfere with movement around an exterior wall having such a cover. Typical examples of while-in-use cover designs include a lid coupled to a fixed base by a hinge.

SUMMARY

Aspects of this document relate to electrical device covers.

In one aspect, an electrical outlet cover assembly for mounting over an electrical outlet, the electrical outlet cover assembly including an electrical outlet mounting box including a front edge and an opening large enough to receive an electrical outlet, wherein the front edge of the electrical outlet mounting box is configured such that the front edge does not extend beyond a front surface of a wall when the electrical mounting box is installed in the wall, a base, a lid pivotably coupled with the base and having a front surface and being positionable between an open position and a closed position with respect to the base, wherein the front surface of the lid is substantially flush with the front surface of the wall when the lid is in the closed position with respect to the base.

In particular implementations one or more of the following may be included. The lid may extend beyond the wall front surface when the lid is in the open position with respect to the base. The lid may be wholly within the base when the lid is in the closed position with respect to the base. The electrical outlet mounting box may include a recessed electrical outlet mounting box including at least two box mounting screw apertures on an inside surface of the box recessed at least one inch behind the front edge of the electrical outlet mounting box. The electrical outlet mounting box may include at least two box mounting screw apertures on an inside surface of the box less than one inch behind the front edge of the electrical outlet mounting box. The electrical outlet mounting box may include an external mounting flange. The base may be slidable within the electrical outlet mounting box.

The lid may be movably coupled with the slidable base at a hinge. The hinge may be mounted on an inner surface of the base. The hinge may extend from the edge of the lid and is coupled with the inner surface of the base. The hinge may be biased in the closed position. Sliding the base forward may create an enlarged cavity between the lid and the opening large enough to receive the electrical outlet. The enlarged cavity may be at least partially defined by a base inner surface. The enlarged cavity may be sized to receive at least one electrical plug. The base may include at least one guide and the electrical outlet mounting box may include at least one guide. The base at least one guide may communicate with the electrical outlet mounting box to provide relative sliding movement of the base and the electrical outlet mounting box. The at least one guides may include one or more guide rails and guide rail stops. The guide rail stops may limit sliding movement of the base. The base may include a front surface that limits pivotable movement of the lid in a closed direction. The assembly may include a cord port for receiving an electrical cord when the lid is in the closed position.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A collapsible in-use cover will hereinafter be described in conjunction with the appended drawings, where like designations denote like elements, and.

DESCRIPTION

Figure 1:
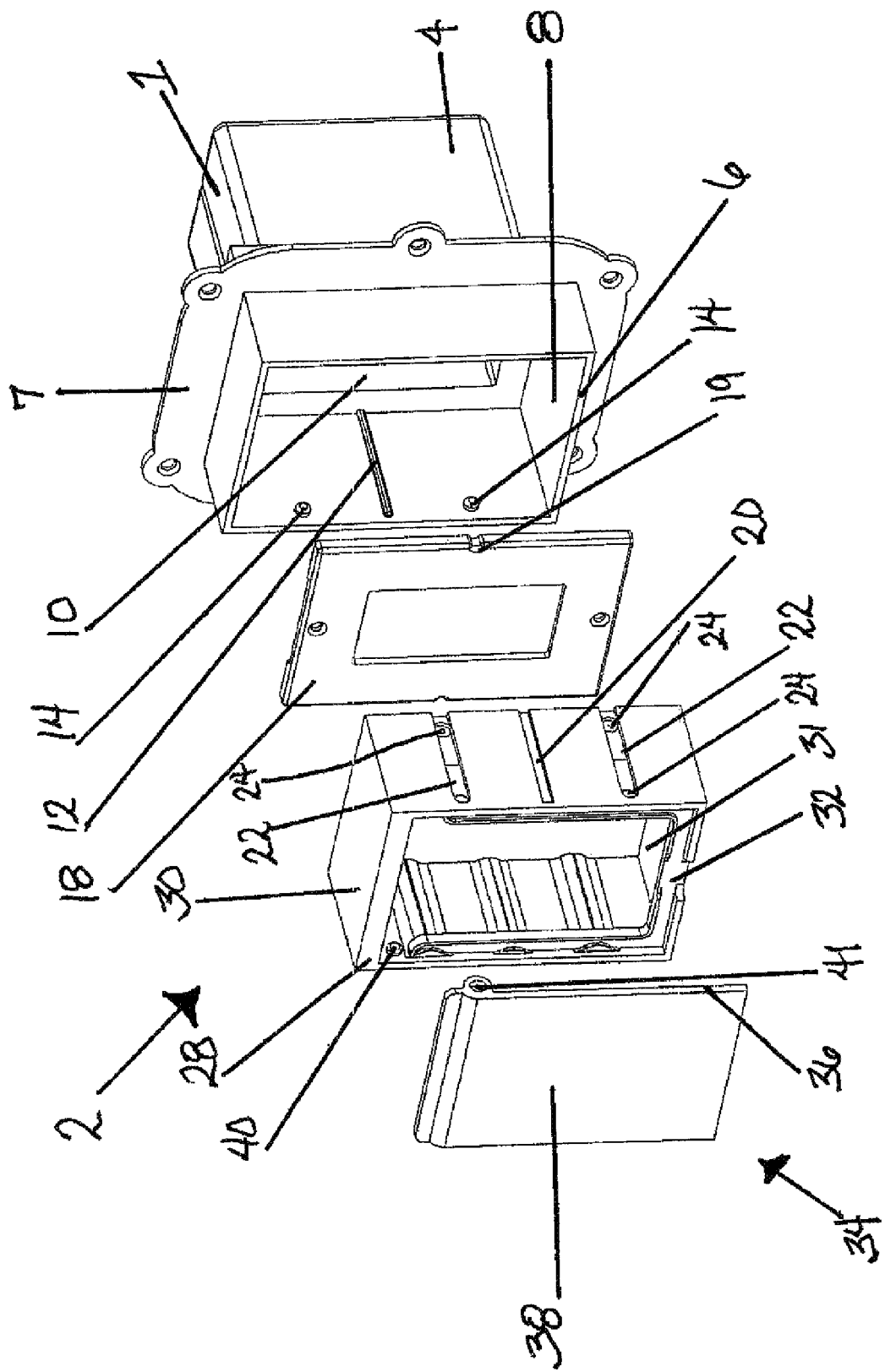
FIG. 1 is an exploded view of a first implementation of an electrical outlet cover assembly.

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with implementations of electrical device covers from this disclosure. Accordingly, for example, although particular electrical device cover assemblies, electrical outlet mounting boxes, openings, guides, expandable bases, lids, cord ports, mounting screw apertures, external mounting flanges, guide rails, guide rail stops, guide protrusions, guide protrusion stops are disclosed, such electrical device cover assemblies, electrical outlet mounting boxes, lids, and implementing components may comprise any shape, size, style, type, model, version, measurement, concentration, material, quantity, and/or the like as is known in the art for such electrical device cover assemblies, electrical outlet mounting boxes, lids and implementing components, consistent with the intended operation of an electrical outlet cover.

There are a variety of electrical outlet cover assembly implementations. FIGS. 1-4 illustrate a first particular implementation of an electrical outlet cover assembly 2. The electrical outlet cover assembly 2 comprises electrical outlet mounting box 4 comprising rear portion 1 and forward portion 5. Mounting flange 7 is provided so that front edge 6 of electrical mounting box 4 can be mounted or installed in a wall, such as an exterior wall of a house or other building. Specifically, with rear portion 1 placed beneath front surface 9 of a wall as shown in FIG. 2, one or more fasteners may be used to attach mounting flange 7 to a portion of the wall that is beneath the front surface 9 of the wall, such that electrical outlet mounting box 4 is held in a fixed position with respect to the wall. With electrical outlet mounting box 4 mounted within the wall, a structural material for walls, such as Sheetrock®, plaster, paneling or the like may be installed over mounting flange 7 so that front edge 6 of electrical outlet mounting box 4 is flush (does not protrude beyond) front surface 9 of the wall.

Figure 2:
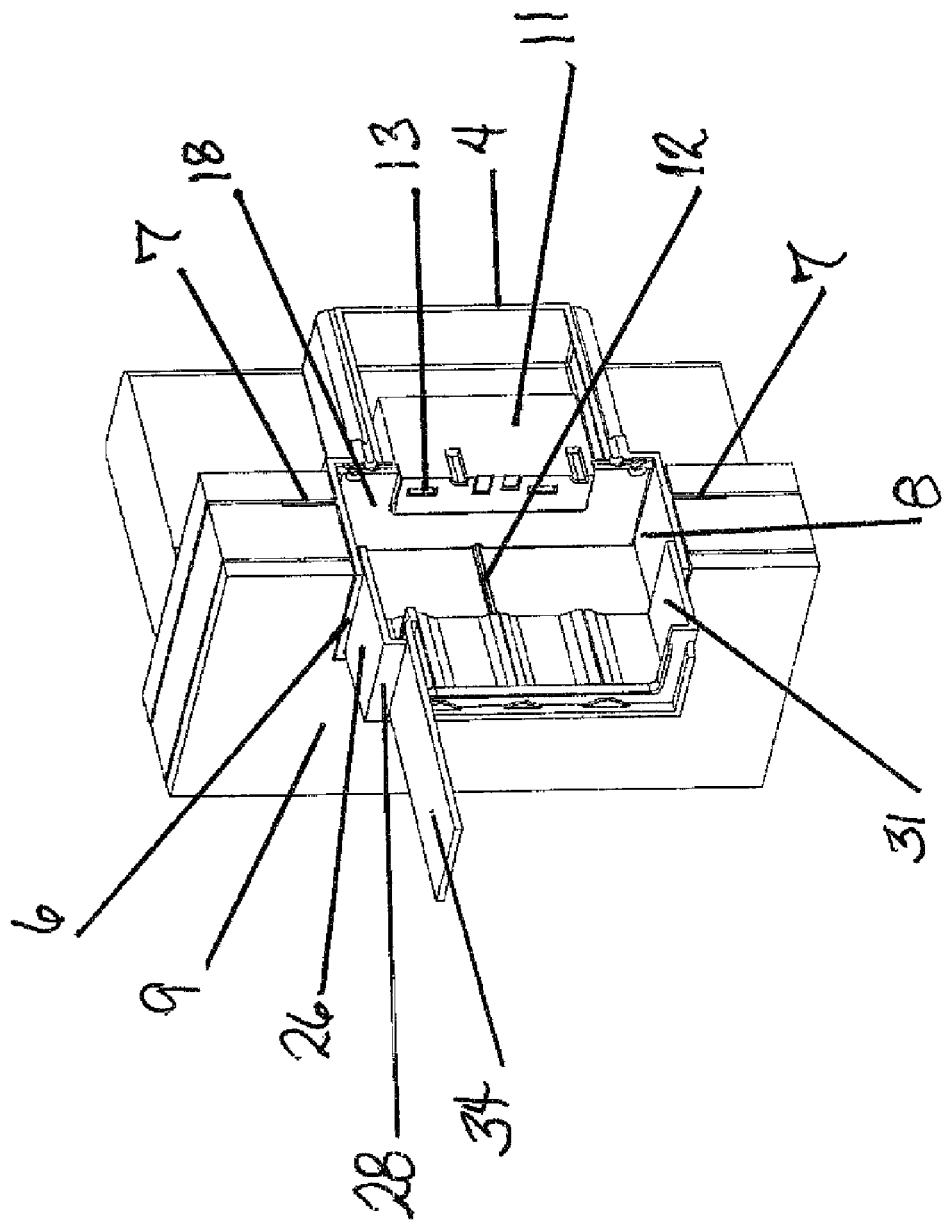
FIG. 2 is a cut away perspective view of a first implementation of an electrical outlet cover assembly as shown in FIG. 4, installed in a wall with an extendable base in an extended position.

Still referring to FIGS. 1 and 2, electrical outlet mounting box 4 comprises opening 10, which is large enough to receive an electrical outlet 11 (FIG. 2). Electrical outlet mounting box 4 further comprises inner surface 8. Electrical outlet 11 may be installed or mounted within electrical outlet mounting box 4 via at least two box mounting screw apertures 16. In the particular implementation shown, the at least two box mounting screw apertures 16 are positioned at least one inch behind the front edge 6 of electrical outlet mounting box 4, such that when electrical outlet 11 is mounted within electrical outlet mounting box 4, the plug blade apertures 13 of electrical outlet 11 are recessed, or positioned behind, front edge 6 of electrical outlet mounting box 4. In other particular implementations, such as the one discussed below in connection with the second particular implementation of electrical outlet cover assembly shown in FIG. 5, the at least two box mounting screw apertures 16 may be located less than one inch behind the front edge 6 of electrical outlet mounting box 4, such that when electrical outlet 11 is mounted within electrical outlet mounting box 4, the plug blade apertures of the electrical outlet are positioned less than one inch behind front edge 6 of electrical outlet mounting box 4.

Further describing FIGS. 1 and 2, inner surface 8 of electrical outlet mounting box 4 comprises one or more guides which, depending upon the particular implementation, may comprise one or more guide rails 12 (which may comprise any rail, ridge, track, or the like), one or more guide protrusions 14 (which may comprise one or more protrusions, bumps, projections, or the like), or both. The operation of the one or more guide rails 12 and the one or more guide protrusions 14 will be described further below, in connection with their mechanical cooperation with extendable base 26. Turning now to wall plate 18, with electrical outlet 11 (FIG. 2) mounted within electrical outlet mounting box 4, a user may install wall plate 18 so that it forms a frame around the electrical outlet and may resist the entry of foreign objects between the perimeter edge of electrical outlet 11 and the inner surface 8 of electrical outlet mounting box 4. The detail of the internals of electrical outlet 11 are not shown in FIG. 2 for simplicity of drawing. Those of ordinary skill in the art will understand what is needed for an electrical outlet. Wall plate 18 may be coupled with electrical outlet mounting box 4 via the at least two box mounting screw apertures 16, or via other screw holes (or other fastener arrangement) that may be provided. In particular implementations, wall plate 18 may comprise one or more notches 19, which may assist in keeping wall plate 18 aligned within opening 10 of electrical outlet mounting box 4, and may therefore further resist the binding of wall plate 18 upon inner surface 8 of electrical outlet mounting box 4 as wall plate 18 is inserted within electrical outlet mounting box 4.

Referring still to FIGS. 1 and 2, extendable base 26 comprises leading edge 28, outer surface 30, inner surface 31, and one or more cord ports 32 (which allow an electrical cord to pass from electrical outlet 11 past front surface 38 of lid 34 when the electrical outlet is in use, the lid 34 is in a closed position, and whether extendable base 26 is in a collapsed position or an extended position). Alternatively, the one or more cord ports may be located in the lid, such as along the bottom edge of the lid, or in both the lid and the base. Inclusion of the cord port in the bottom edge of the lid may also assist by providing a finger pull through which to open the lid. For locations where the electrical outlet can be exposed to weather conditions or water or other contaminants, it is often desired to be able to protect the electrical outlet by closing the lid of the cover while a plug is plugged into the outlet. Such outlet covers are called while-in-use covers. Inner surface 31 comprises base hinge element 40 which is coupled to lid hinge element 41 (which extends from edges 36 of lid 34) such that lid 34 is hingedly coupled with extendable base 26 via the hinge (which is formed through the mechanical cooperation of base hinge element 40 and lid hinge element 41). Therefore, it will be understood that the hinge that is formed through the cooperation of base hinge element 40 and lid hinge element 41 extends from the edge of lid 34 and is coupled with inner surface 31 of extendable base 26. In particular implementations, the hinge may be biased with a spring, or other biasing mechanism, in order to bias the lid 34 to a closed position with respect to extendable base 26. It is expected that other hinge configurations and many biased hinge configurations are possible and may be substituted from the art into the particular implementation shown in the Figures without undue experimentation.

Turning specifically to extendable base 26, outer surface 30 of extendable base 26 comprises one or more guides which, depending upon the particular implementation, may comprise one or more guide rail stops 20, one or more guide protrusion channels, 22, and/or one or more guide protrusion stops 24. As noted above, inner surface 8 of electrical outlet mounting box 4 comprises one or more guides (which, depending upon the particular implementation, may comprise one or more guide rails 12 and/or one or more guide protrusions 14). One or more guide rails 12 on the inner surface 8 of electrical outlet mounting box 4 may be aligned with one or more guide rail stops 20 on outer surface 30 of extendable base 26, such that when extendable base 26 is slid between a collapsed position (FIG. 3) and an extended position (FIG. 4) with respect to electrical outlet mounting box 4 (described further below), the mechanical cooperation of one or more guide rails 12 with one or more guide rail stops 20 (which may comprise, a channel, a groove, a notch, or the like) may assist in maintaining the alignment of extendable base 26 with respect to electrical outlet mounting box 4. It will be further understood that maintaining the alignment of extendable base 26 with respect to electrical outlet mounting box may assist in resisting the binding of outer surface 30 of extendable base 26 with respect to inner surface 8 of electrical outlet mounting box 4, as the extendable base 26 is slid between its extended and collapsed positions.

The mechanical cooperation of the one or more guide protrusions 14 with respect to the one or more guide protrusion channels 22 and guide protrusion stops 24 will now be described. In particular, one or more guide protrusions 14 on the inner surface 8 of electrical outlet mounting box 4 may be aligned with one or more guide protrusion channels 22

(which may comprise a channel, a groove, a notch, or the like) on outer surface 30 of extendable base 26, such that when extendable base 26 is slid between a collapsed position and an extended position with respect to electrical outlet mounting box 4 (described further below), the mechanical cooperation one or more guide protrusions 14 with guide protrusion channels 22 may assist in maintaining the alignment of extendable base 26 with respect to electrical outlet mounting box 4. It will be further understood that maintaining the alignment of extendable base 26 with respect to electrical outlet mounting box may assist in resisting the binding of outer surface 30 of extendable base 26 with respect to inner surface 8 of electrical outlet mounting box 4, as the extendable base 26 is slid between its extended and collapsed positions.

Disposed within the forward and/or rear portions of the one or more guide protrusion channels 22 are one or more guide protrusion stops 24 (which may comprise an indentation, recess, depression, or the like). As extendable base 26 is slid to its collapsed position (with respect to electrical outlet mounting box 4), one or more guide protrusions 14 may come to rest in the one or more guide protrusion stops 24 such that the further movement of extendable base 26 is mechanically resisted by the mechanical cooperation of the one or more guide protrusions 14 with the one or more guide protrusion stops 24. Of course, the mechanical resistance caused by the cooperation of the one or more guide protrusions 14 with the one or more guide protrusion stops 24 may be overcome by exerting force. That is, once the extendable base is in its collapsed position, a user may move the extendable cover to an extended (or partially extended) position by pulling outwardly on the extendable base 26 with sufficient force to overcome the mechanical resistance caused by the cooperation of the one or more guide protrusions 14 with the one or more guide protrusion stops 24.

Likewise, as extendable base 26 is slid to its fully extended position (with respect to electrical outlet mounting box 4), one or more guide protrusions 14 may come to rest in the one or more guide protrusion stops 24 such that the further movement of extendable base 26 is mechanically resisted by the mechanical cooperation of the one or more guide protrusions 14 with the one or more guide protrusion stops 24. Mechanical resistance of further movement of the extendable base 26 via the mechanical cooperation of the one or more guide protrusions 14 with the one or more guide protrusion stops 24 resists the decoupling of extendable base 26 with respect to electrical outlet mounting box 4. Of course, the mechanical resistance caused by the cooperation of the one or more guide protrusions 14 with the one or more guide protrusion stops 24 may be overcome by exerting additional force. That is, once the extendable base is in its fully extended position, a user may move the extendable cover to an collapsed (or partially collapsed) position by pushing inwardly on the extendable base 26 with sufficient force to overcome the mechanical resistance caused by the cooperation of the one or more guide protrusions 14 with the one or more guide protrusion stops 24. Moreover, a user wishing to decouple extendable base 26 from electrical outlet mounting box 4 may pull extendable base 26 outwardly from electrical outlet mounting box 4 with sufficient force so that the extendable base 26 becomes decoupled from the electrical outlet mounting box 4.

Figure 3:
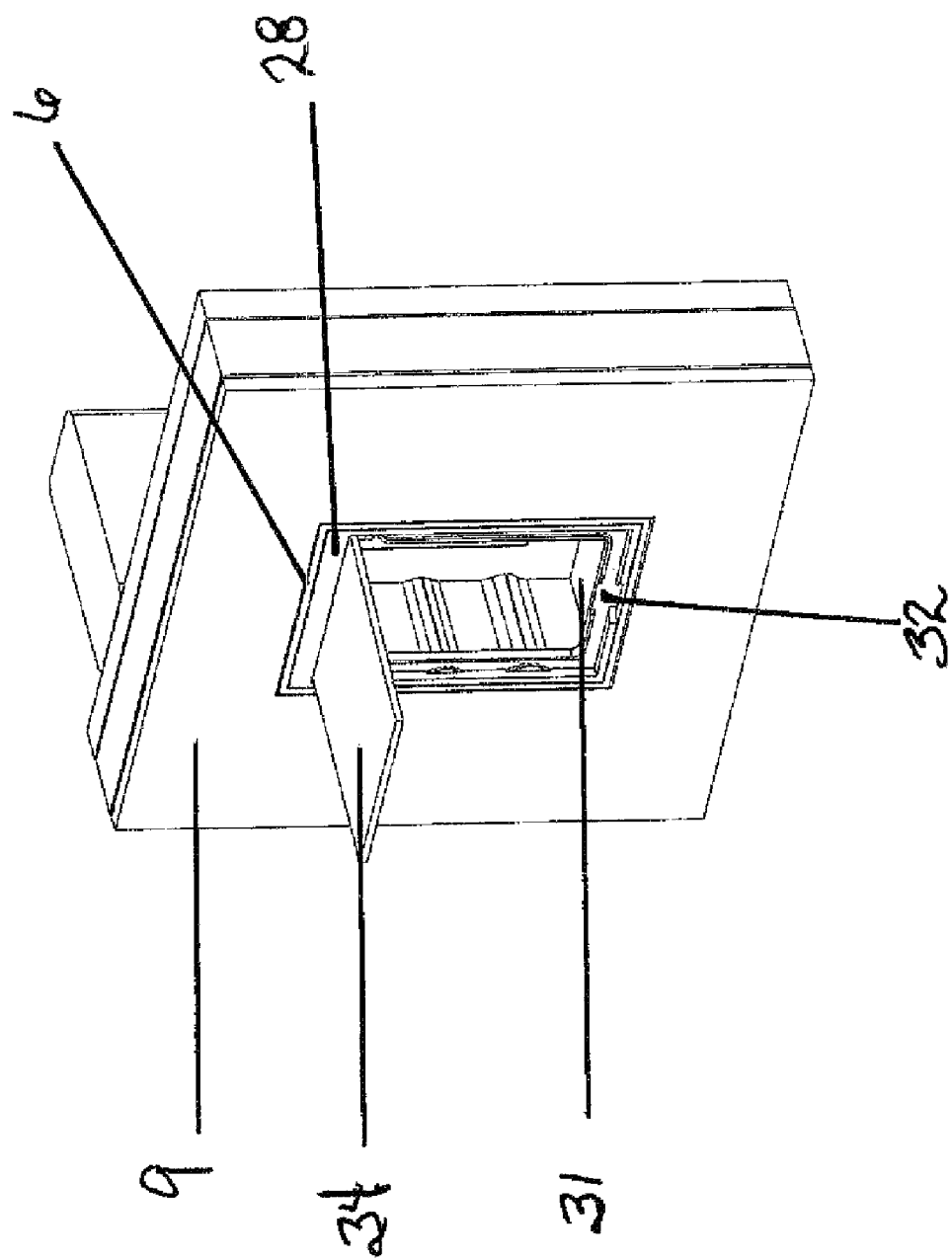
FIG. 3 is a perspective view of a first implementation of an electrical outlet cover assembly with an extendable base in a collapsed position.
Figure 4:
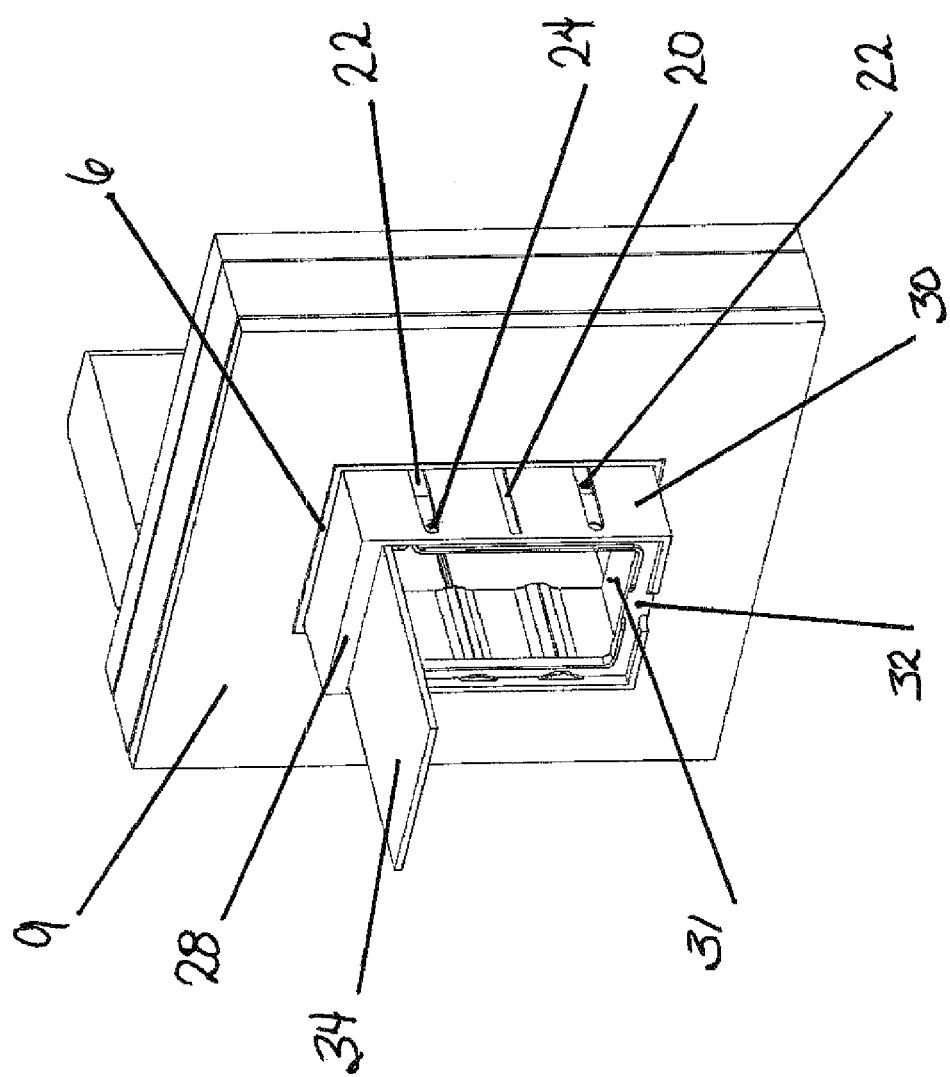
FIG. 4 is a perspective view of a first implementation of an electrical outlet cover assembly as shown in FIG. 2 with the extendable base in an extended position.
Figure 6:
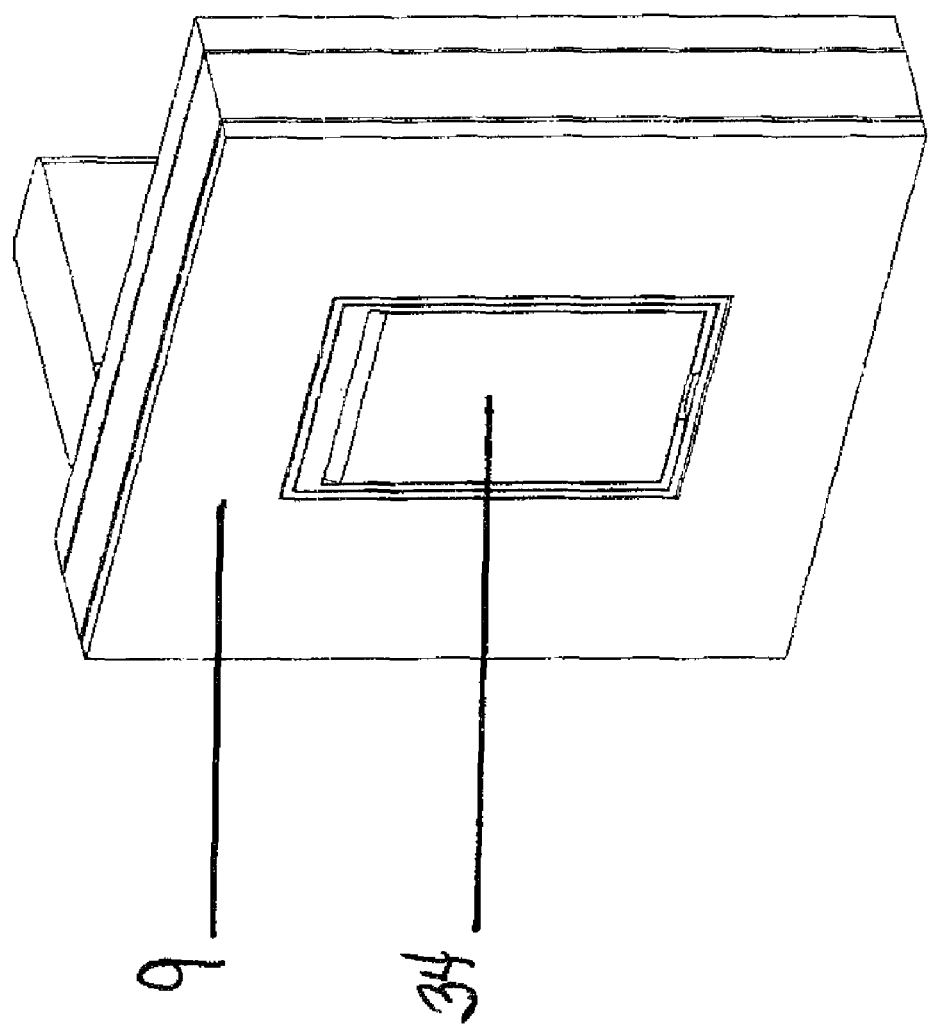
FIG. 6 is a perspective view of an implementation of an electrical outlet cover assembly with the lid closed.

Referring now specifically to FIGS. 3 and 4, the slideability of extendable base 26 with respect to electrical outlet mounting box 4 will be further described. As alluded to above, extendable base 26 is slideable between a collapsed position and an extended position (with respect to electrical outlet mounting box 4). Referring specifically to FIG. 3, the collapsed position of extendable base 26 is illustrated. In particular, when the extendable base 26 is in the collapsed position, the leading edge 28 of extendable base 26 is flush with, or does not protrude beyond, front surface 9 of the wall within which the electrical outlet cover assembly 2 is installed. In particular implementations, the front surface 38 of the lid 34 is also substantially flush with the front surface 9 of the wall (see FIG. 6 for example) when the lid is closed. Although in other implementations the lid may rest against the front surface of the wall or extend slightly beyond the front surface. In particular implementations, the front surface 38 of the lid may be textured or colored to match the front surface 9 of the wall. Referring now to FIG. 4, the expanded position of extendable base 26 (with respect to electrical outlet mounting box 4) is shown. In particular, when the extendable base 26 is in the extended position, the leading edge 28 of extendable base 26 extends beyond front surface 9 of the wall. Of course, extendable base 26 may be also positioned in a partially-extended or a partially-collapsed position.

Figure 5:
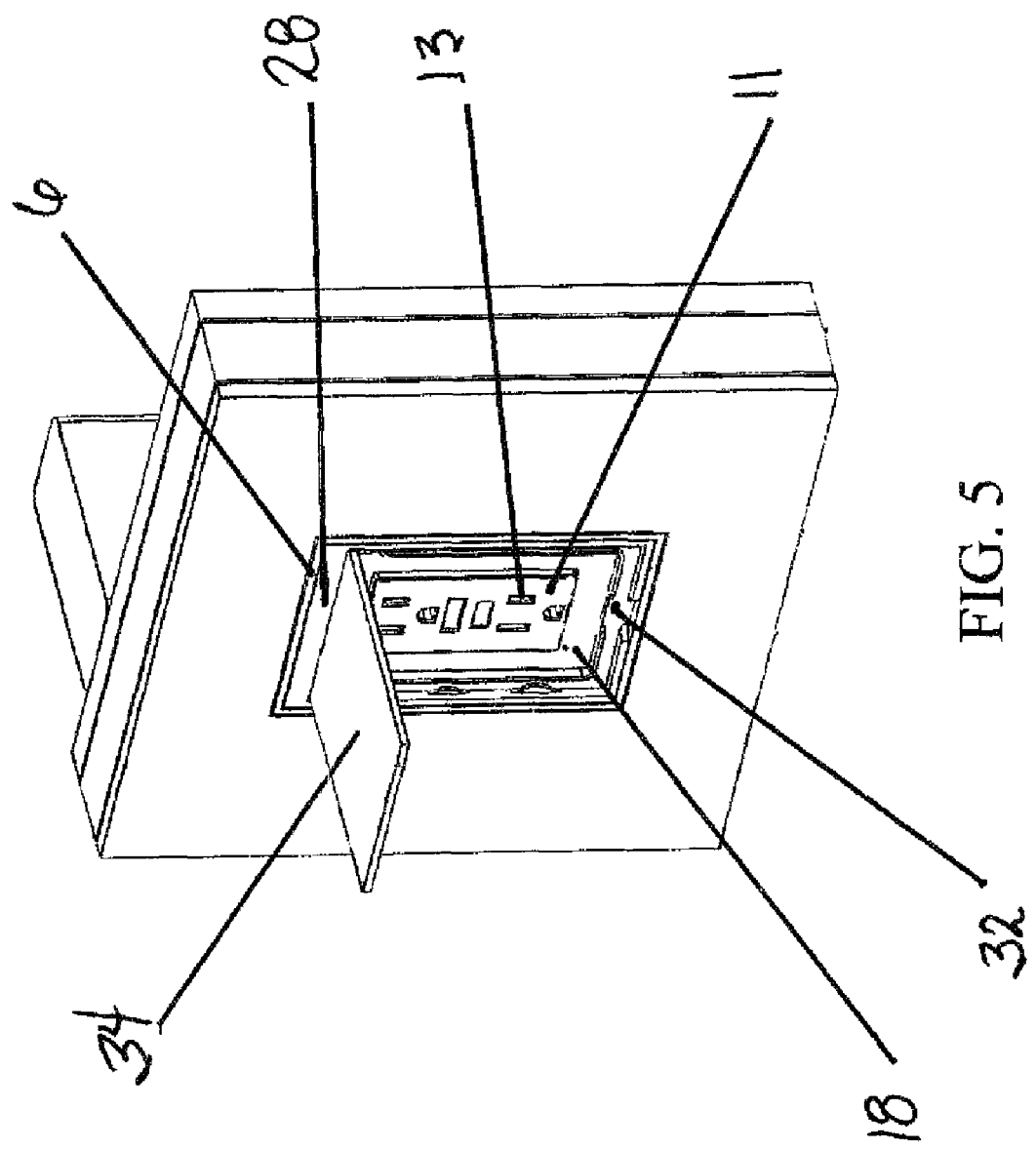
FIG. 5 is a perspective view of second implementation of an electrical outlet cover assembly with the extendable base in a collapsed position.

Turning now to FIG. 5, a second particular implementation of an electrical outlet cover assembly 3 is illustrated. As alluded to above, in the second particular implementation of an electrical outlet cover assembly 3, the at least two box mounting screw apertures 16 (obscured in this view) may be located less than one inch behind the front edge 6 of electrical outlet mounting box 4, such that when electrical outlet 11 is mounted within electrical outlet mounting box 4, the plug blade apertures 13 of the electrical outlet are positioned less than one inch behind front edge 6 of electrical outlet mounting box 4. It will be clear therefore, that when extendable base 26 is in a collapsed position with respect to electrical outlet mounting box 4 (as shown), the plug blade apertures 13 of electrical outlet 11 may be substantially flush with (recessed less than an inch behind) leading edge 28 of extendable base 26

It will be understood by those of ordinary skill in the art that the concepts of using electrical outlet mounting boxes, extendable bases, and lids to cover an electrical outlet in a collapsed and an expanded position, as disclosed herein, is not limited to outdoor covers or to the specific implementations shown herein. For example, it is specifically contemplated that the components included in a particular implementation of an electrical device cover may be formed of any of many different types of materials or combinations that can readily be formed into shaped objects and that are consistent with the intended operation of an electrical outlet cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical outlet mounting boxes, extendable bases, lids, hinges, guides, wall plates, and any other components forming a particular implementation of an electrical outlet cover assembly may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for an electrical outlet cover assembly may be utilized. Accordingly, for example, although electrical outlet mounting boxes, extendable bases and lids may be disclosed, such components may comprise any shape, size, style, type, model, version, class, grade, measurement, concentration, material, weight, quantity, and/or the like consistent with the intended operation of a method and/or system implementation for an electrical outlet cover assembly may be used.

In places where the description above refers to particular implementations of an electrical outlet cover assembly, it should be readily apparent that a number of modifications may be made without departing from the spirit thereof and that these implementations may be applied to other electrical outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover assembly for mounting over an electrical outlet, the electrical device cover assembly comprising:
   an electrical outlet mounting box comprising a front edge, an opening large enough to receive an electrical outlet, and an inner surface formed by a plurality of side walls and a back wall, wherein the front edge of the electrical outlet mounting box is configured such that the front edge does not extend beyond a front surface of a wall when the electrical outlet mounting box is installed in the wall, and the inner surface of the electrical outlet mounting box comprising a plurality of guides;
   a base comprising a plurality of side walls, and an outer surface positioned in direct contact with the inner surface of the electrical outlet mounting box and comprising a plurality of guides positioned to mechanically cooperate with the plurality of guides on the inner surface of the electrical outlet mounting box to permit the base to slide between an extended position and a collapsed position relative to the electrical outlet mounting box;
   a lid pivotably coupled to the base with a hinge and having a front surface, the lid being positionable between an open position and a closed position with respect to the base, wherein the front surface of the lid is substantially flush with the front surface of the wall when the lid is in the closed position with respect to the base.

2. The electrical device cover assembly of claim 1 wherein the lid extends beyond the wall front surface when the lid is in the open position with respect to the base.

3. The electrical device cover assembly of claim 1 wherein the lid is wholly within the base when the lid is in the closed position with respect to the base.

4. The electrical device cover assembly of claim 1 wherein the electrical outlet mounting box comprises at least two box mounting screw apertures on an inside surface of the box recessed at least one inch behind the front edge of the electrical outlet mounting box.

5. The electrical device cover assembly of claim 1 wherein the electrical outlet mounting box comprises at least two box mounting screw apertures on an inside surface of the box less than one inch behind the front edge of the electrical outlet mounting box.

6. The electrical device cover assembly of claim 1 wherein the electrical outlet mounting box comprises an external mounting flange.

7. The electrical device cover assembly of claim 1 wherein the hinge is mounted on an inner surface of the base.

8. The electrical device cover assembly of claim 7 wherein the hinge extends from the edge of the lid and is coupled with the inner surface of the base.

9. The electrical device cover assembly of claim 7 wherein the hinge is biased in the closed position.

10. The electrical device cover assembly of claim 1 wherein sliding the base forward creates an enlarged cavity between the lid and the opening large enough to receive the electrical outlet.

11. The electrical device cover assembly of claim 10 wherein the enlarged cavity is at least partially defined by a base inner surface.

12. The electrical device cover assembly of claim 10 wherein the enlarged cavity is sized to receive at least one electrical plug.

13. The electrical device cover assembly of claim 1 wherein at least one guide comprises one or more guide rails or guide rail stops.

14. The electrical device cover assembly of claim 13 wherein the guide rail stops limit sliding movement of the base.

15. The electrical device cover assembly of claim 1 wherein the base further comprises a front surface that limits pivotable movement of the lid in a closed direction.

16. The electrical device cover assembly of claim 1 further comprising a cord port between the base and the lid for receiving an electrical cord when the lid is in the closed position.

* * * * *